US007010742B1

(12) United States Patent
Hsu et al.

(10) Patent No.: US 7,010,742 B1
(45) Date of Patent: Mar. 7, 2006

(54) GENERALIZED SYSTEM FOR AUTOMATICALLY HYPERLINKING MULTIMEDIA PRODUCT DOCUMENTS

(75) Inventors: Liang-Hua Hsu, Robbinsville, NJ (US); Peiya Liu, East Brunswick, NJ (US)

(73) Assignee: Siemens Corporate Research, Inc., Princeton, NJ (US)

(*) Notice: Subject to any disclaimer, the term of this patent is extended or adjusted under 35 U.S.C. 154(b) by 0 days.

(21) Appl. No.: 09/401,382

(22) Filed: Sep. 22, 1999

(51) Int. Cl.
*G06F 17/00* (2006.01)

(52) U.S. Cl. .................................. 715/501.1; 715/513

(58) Field of Classification Search ............... 707/513, 707/501.1; 715/513, 501.1

See application file for complete search history.

(56) References Cited

U.S. PATENT DOCUMENTS

| | | | | |
|---|---|---|---|---|
| 4,982,344 A | * | 1/1991 | Jordan | 345/804 |
| 5,404,534 A | * | 4/1995 | Foss et al. | 709/315 |
| 5,430,872 A | * | 7/1995 | Dahod et al. | 707/104.1 |
| 5,634,062 A | * | 5/1997 | Shimizu et al. | 715/501.1 |
| 5,694,594 A | * | 12/1997 | Chang | 707/6 |
| 5,708,825 A | * | 1/1998 | Sotomayor | 707/501.1 |
| 5,724,595 A | * | 3/1998 | Gentner | 707/501.1 |
| 5,794,257 A | * | 8/1998 | Liu et al. | 707/501.1 |
| 5,809,317 A | * | 9/1998 | Kogan et al. | 715/501.1 |
| 5,995,099 A | * | 11/1999 | Horstmann | 707/501.1 |
| 6,092,074 A | * | 7/2000 | Rodkin et al. | 707/102 |
| 6,381,637 B1 | * | 4/2002 | Kamada | 709/218 |

OTHER PUBLICATIONS

Liu et al., "Towards Automating the Creation of Hypermedia Service Manuals by Compiling Specifications", May 1994, IEEE, pp. 203-212.*
XP004091791—Agosti M et al: "On the use of information retrieval techniques for the automatic construction of hypertext" Information Processing & Management Elsevier, Barking, GB, vol. 33, No. 2, Mar. 1, 1997, ISSN; 0306-4573, p. 133—p. 135 p. 138 -p. 140.
XP000308936—"Automatic Hypermedia Link Generation" IBM Technical Disclosure Bulletin, IBM Corp. New York, US, vol. 35, No. 1A, Jun. 1, 1992, ISSN: 0018-8689 p. 447 -p. 448.
XP004095310—Hartman J H et al: "Index-based hyperlinks" Computer Networks and ISDN Systems, North Holland Publishing. Amsterdam, NL, Sep. 1, 1997, pp. ISSN: 0169-7552 p. 129 -p. 131.

* cited by examiner

*Primary Examiner*—Sanjiv Shah
(74) *Attorney, Agent, or Firm*—Donald B. Paschburg; F. Chau & Associates, LLC (57) ABSTRACT

A generalized hyperlinking system interactively creates hyperlinks one a time or automatically in mass production, statically at authoring time or dynamically at browsing time. A Generalized Hyperlink Specification Language (GHSL) allows for the author to specify patterns and contexts for identifying sources and destinations of links in all media and define link information as interfaces between hyperlinking modules. The generalized automatic hyperlinking system includes a source identifier, a source anchor generator, an initial semi-link generator, an intermediate destination identifier, an intermediate anchor generator, an intermediate link generator, an intermediate semi-link generator, a destination identifier, a final semi-link generator, a final link generator, link management, a link database, a link browser, a link interpreter and a document browser.

26 Claims, 10 Drawing Sheets

```
source<label>:<description>
    document
        <list of document references>
    end
    pattern
        <list of pattern specifications>
    end
    context
        <list of context specifications>
    end
    anchor
        <list of anchor specifications>
    end
    link
        <list of link specifications>
    end
end
```

FIG. 4

```
<pattern specification>::=<sequence of pattern expressions>
<pattern expression>::=<pattern term> | <pattern assignment>
<pattern term>::=<subpattern> | <subpattern extraction>
<subpattern extraction>::="/" <subpattern> "/"
<pattern assignment>::=<new variable>"="<pattern term>|
                      "{"<pattern term>"/"<new variable>"}"
<subpattern>::="<sequence of characters>"|
               "["<subset of characters>"]"<number of repetitions> |
               "[^"<subset of characters>"]"<number of repetitions>
<number of repetitions>::="1" | "2" | "3" | ... | "?" | "*" | "+"
```

FIG. 5

```
<context specification>::=<context expression>
<context expression>::=<context term> | <context assignment>
<context term>::=<document object> | <variable> |
                 <document object> <object relationship> <document object> |
                 <document object> <object relationship> <context expression> |
                 <context expression> <object relationship> <document object> |
                 <context expression> <object relationship> <context expression>
<context assignment>::=<new variable>":"<context term> |
                 "{" <context term> "/" <new variable> "}"
<object relationship>::="contained" | "inside" | "child-of" | "descendent-of" |
                 "containing" | "parent-of" | "ancestor-of" | "sibling-of"
<document object>::="<" <object name> ">" |
                 "<" <object name> <attribute list> ">"
<attribute list>::=<attribute> <attribute> ...
<attribute>::=<attribute name> "=" <value>
```

FIG. 6

```
<anchor specification>::=<anchor structure transformation>
<anchor structure transformation>::=<source context> "=>" <anchor context>
<source context>::=<source object list>
<source object list>::=<source object> <source object> ...
<source object>::=<document object> | <object assignment> | <variable>
<object assignment>::=<new variable> ":" <document object> |
                 "{" <document object> "/" <new variable> "}"
<anchor context>::=<target object list>
<target object list>::=<target object> <target object> ...
<target object>::=<new object> | <variable>
```

FIG. 7

```
<link specification>::=<link modification list>
<link modification list>::=<link modification> <link modification> ...
<link modification>::=<anchor content modification> | <link attribute modification>
<anchor content modification>::=<object variable> <link operator> <link value>";"
<link attribute modification>::=<link attribute> <link operator> <link value>";"
<link attribute>::=<object variable>"."<attribute name>
<link operator>::="=" | "+="
<link value>::=<any string> | <link record>
<link record>::="{" <link assignment list>"}"
<link assignment list>::=<link field assignment> <link field assignment> ...
<link field assignment>::=<link field> "=" <link value> ";"
<link field>::=<link id> | <link specification label> | <link description> |
               <link category> | <link type> | <link subtype> | <destination type> |
               <destination reference> | <parameter list>
<destination reference>::=<object id> | <object path> | <script>
<parameter list>::=<parameter> <parameter> ...
```

FIG. 8

```
source S101: "KKS numbers"
    document
        31.sgm;
    end
    pattern
        p="MB"[A-Z[0-9]2[A-Z]2[0-9]3;
    end
    context
        <AnyDocX><ParaX, ParaX2, ParaX3, ParaX4, ParaX5>p</></>;
    end
    anchor
        p=>{KKSNum Name=unique-name("NA")>p</>/a};
    end
    link
        a.Linkend+={link type = "Schematic Diagram";
                    destination reference=p; }
    end
end
```

FIG. 9

```
intermediate <label> : <description>
    source
        <list of source and intermediate destination labels>
    end
    document
        <list of document references>
    end
    pattern
        <list of pattern specifications>
    end
    context
        <list of context specifications>
    end
    anchor
        <list of anchor specifications>
    end
    link
        <list of link specifications>
    end
end
```

FIG. 10

```
destination <label> : <description>
    source
        <list of source and intermediate destination labels>
    end
    ...
end
```

GENERALIZED SYSTEM FOR AUTOMATICALLY HYPERLINKING MULTIMEDIA PRODUCT DOCUMENTS

CROSS-REFERENCE TO RELATED APPLICATIONS

This patent application is related to copending U.S. patent application entitled "Automatic Generation of Card-Based Presentation Documents From Multimedia Data", Ser. No. 09/401,383, filed on Sep. 22, 1999 and assigned to the same assignee as the present invention.

BACKGROUND OF THE INVENTION

1. Field of the Invention

The present invention relates to automatically hyperlinking multimedia product documents and more particularly to a generalized hyperlinking system to create hyperlinks interactively, one at a time, or automatically, in mass production, statically, at authoring time, or dynamically, at browsing time.

2. Description of the Prior Art

Due to the growing popularity of the World Wide Web in recent years, hyperlinking has become a viable mechanism to access information in many applications on local machines, an intranet, and the Internet. In manufacturing, product documents are now being provided in electronic form on CDs and over networks to the engineers and customers. Typically, product documents in different media (including text, images, schematic diagrams, CAD drawings, audio, video, etc.) are identified and linked together manually, so that when browsing one document, related documents can be easily retrieved. Since textual documents can usually be represented (or exported) in the ASCII format, further processing can be performed manually or automatically to identify words and phrases to be linked to other textual and non-textual documents. In advanced multimedia documentation systems, non-textual documents are also processed with graphics and imaging algorithms to extract useful information which can also be represented in some ASCII form to facilitate further processing such as querying and hyperlinking.

Figure 1:
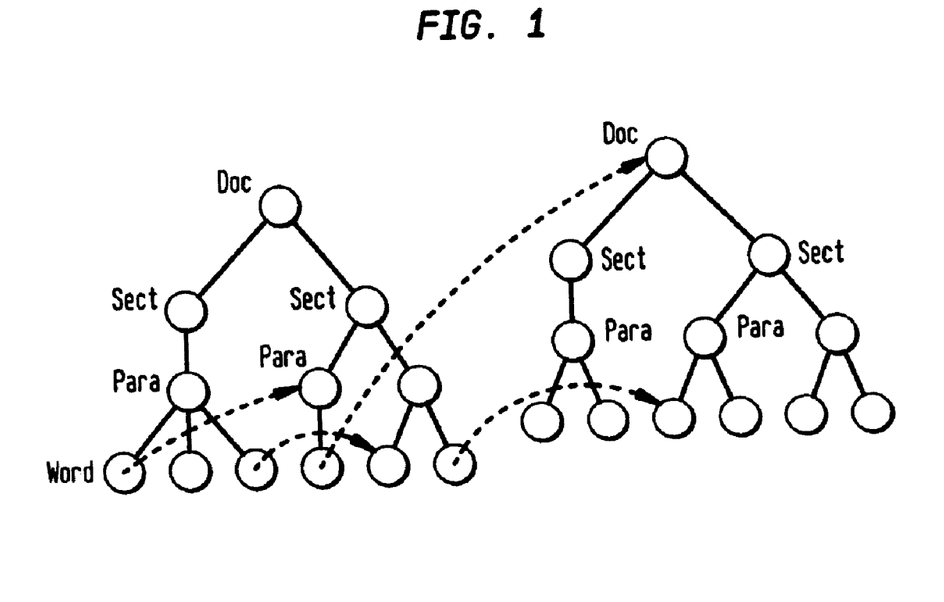
FIG. 1 illustrates some examples of hyperlinks within and across documents.

In order to fully utilize technical contents to support various product-related activities and improve interchangeability of product information among vendors, standard markup languages such as HTML, SGML and XML are being used to represent product documents in all media. HTML is described in HTML 4.0 Reference Specification, W3C Recommendation, April 1998. SGML is described in SGML, ISO 8879:1986 Text and Office Systems-Standard Generalized Markup Language, Geneva, 1986. XML is described in XML 1.0 Reference Specification, W3C Recommendation, February 1998. SGML-based product documents are well-structured for specific application domains such that technical contents can be more precisely identified and related to one another. In general, an SGML document is a hierarchical structure of document objects of all types of media. A document hyperlink is a relationship between two document objects within a document or across two different documents. Some examples of hyperlinks within and across documents are shown in FIG. 1.

A complete hyperlinking process involves three major tasks: link authoring, link management, and link browsing. Link authoring refers to the task of recognizing the relationships between two document objects and generating the link information. Link management refers to the task of storing link information to support link authoring, link browsing and other applications. Link browsing refers to the task of activating links to retrieve the needed information. These three tasks can be performed separately or in one single step, depending on the applications and the complexity of hyperlinking supported.

In the link authoring process, there are three technical issues to be addressed: when to create the links, how to identify sources and destinations and what link information to be recorded. Currently, most multimedia tools that support hyperlinking allow the author to interactively select a segment of text or an object in a document as a source or destination, and insert some form of identification of the destination in the source or in a separate file. Thus, a link is established between the source object in one document and the destination object in another (same or different document). Such an interactive link-editing method is sufficient for a small number of arbitrary links, however, the process can be laborious and error-prone for handling a large amount of documents for a complex product. A hyperlink that relates only one pair of source and destination in an arbitrary manner and cannot be generalized to relate a large number of source-destination pairs, is referred to as a trivial link. Trivial links can be easily captured with interactive link-editing tools at either authoring time or browsing time.

An automatic hyperlinking system is disclosed in U.S. Pat. No. 5,794,257 entitled "Automatic Hyperlinking On Multimedia By Compiling Link Specifications" issued on Aug. 11, 1998 and assigned to the same assignee as the present invention. This system supports hyperlinking in a large amount of product documents. Since product documents are well-structured and often refer to one another through precisely-defined technical terms, it is possible to specify patterns that exist in specific contexts to be linked together in a form of link specifications or rules. An automatic hyperlinker is invoked to process the link rules, generate link instances and insert link information in the source (and if necessary, the destination) documents. Such an automatic hyperlinking process is often performed at authoring time and the author can also verify the link information before the hyperlinked documents are delivered to the end users, such as operators and engineers of complex machinery. (The quality of their work may depend on the accuracy of the technical information that is related through the links).

Typical link information inserted in source objects includes references to destinations, applications for rendering the referenced destinations, and optionally, references to objects contained in the destinations and other bookkeeping information. The representation of the references to the (destination) objects is based on the addressing mechanism adopted by the hyperlinking process. It can be as simple as a unique id. (e.g., N23509426), or a relative path from the root object to the referenced object (e.g., TEI), or it can be as complex as a script or program that issues a query to a document database. For documents that are distributed over the Web, URLs (Universal Resource Locators) are applied. These URL's refer to the host machines on the network and the directory paths where the documents are located on the host machines.

For consumer types of information retrieval, such as most applications on the Web nowadays, the source and the destination of a link are often "loosely related". This is due to the fact that information on the Web is contributed by individual organizations voluntarily and scattered across five continents. The structure of the (destination) documents is defined arbitrarily by the owners and all document contents and structures can change any time. Thus, it is not practical to attempt to verify the destinations at authoring time (other than manually browsing the destination Web sites), or ensure the existence of the destination documents at browsing time. In this case, URLs that refer to the "home pages" (i.e., entry points to Web sites) are used at authoring time. When such documents are browsed, the document browser makes use of the information in a URL to contact the destination site and attempt to retrieve the needed document.

In general, hyperlinks to destination information that cannot be precisely identified and guaranteed are referred to as semi-links. Although semi-links do not provide the same quality to the end users as fully verified links, it is simple to generate at authoring time and flexible to apply at browsing time. Typically, some information from the source objects is extracted as link information and the document browser, based on such link information, can do whatever is necessary to retrieve the destination information without being completely bound to what is specified at authoring time. For example, based on the id. of a machine part together with an indication of the type of product information needed, a document browser can issue a query to the product document database to retrieve the relevant information and present it to the user. As in Web applications, this type of link remains "valid" (as long as there are some documents existing at the destinations) at all times, even if the information in the product document database is updated frequently. A hyperlinking process for generating semi-links is referred to as partial hyperlinking.

In addition to the uncertainty of destination documents, there are also (source) documents that are created on the fly and cannot be processed "statically" beforehand, e.g., annotations that are added to a document by an expert, messages that are sent back and forth between two engineers, etc. In a manufacturing environment, this type of information has its technical values and often becomes part of the product documentation. Thus, a dynamic hyperlinking mechanism is required to allow the viewer of such type of information to identify the source objects of potential links immediately after such "documents" are made available. Due to the nature of this type of document and the time constraint, dynamic hyperlinking applies simple link rules (or built-in knowledge) and inserts semi-links to relate to destination information. Recently, most word processors and desktop publishing software have also incorporated some limited capability of dynamic hyperlinking, e.g., they are able to recognize proprietary document structures, URLs, etc. . . . , and insert appropriate links on the fly automatically.

Hyperlinks in non-technical documents mostly relate sources to destinations directly. However, technical documents are complicated structures and information can be related in many different ways directly or indirectly through, for example, a table of contents, a reference lists, etc . . . . An indirect link goes through one or more intermediate destinations to look up and collect more information before it reaches its final destination. This type of indirect links is referred to as chain links. A chain link can be followed in two different ways, i.e., a document browser can stop at each intermediate destination and give the user a chance to view the intermediate information before moving forward or it can work quietly behind the scene and retrieve only the document at the final destination.

It is an object of the present invention to develop a Generalized Hyperlinking Process (GHP) to address most of the technical issues involved in link authoring, link management, and link browsing as discussed above. In order to support various automation tasks and modularize various steps of the hyperlinking process, it is a further object of the present invention to develop a Generalized Hyperlink Specification Language (GHSL) so that the author can specify patterns and contexts for identifying sources and destinations of links in all media and define link information as interfaces between hyperlinking modules (or tools). In particular, it is an object of the present invention that a GHSL specification be processed by the hyperlinker to generate link instances and link instances are managed by the link manager to support incremental hyperlinking at authoring time and interpreted by the link interpreter to effect hyperlinking behavior at browsing time.

SUMMARY OF THE INVENTION

The present invention provides a generalized system for automatically hyperlinking multimedia product documents. In the Generalized Hyperlinking Process (GHP), hyperlinks can be created interactively one a time or automatically in mass production, statically at authoring time or dynamically at browsing time, and incrementally or one time only. Hyperlinks can relate a source to a destination directly or indirectly through intermediate steps and can be inserted directly into documents or stored separately in a link database. Depending on the applications, hyperlinks can be fully verified at authoring time to ensure the quality of hyperlinking or partially specified to offer flexibility at browsing time. In order to support various automation tasks and modularize various steps of the hyperlinking process, a Generalized Hyperlink Specification Language (GHSL) allows for the author to specify patterns and contexts for identifying sources and destinations of links in all media and define link information as interfaces between hyperlinking modules (or tools). In particular, a GHSL specification is processed by the hyperlinker to generate link instances and link instances are managed by the link manager to support incremental hyperlinking at authoring time and interpreted by the link interpreter to effect hyperlinking behavior at browsing time.

The generalized automatic hyperlinking system comprises a source identifier, a source anchor generator, an initial semi-link generator, an intermediate destination identifier, an intermediate anchor generator, an intermediate link generator, an intermediate semi-link generator, a destination identifier, a final semi-link generator, a final link generator, link management, a link database, a link browser, a link interpreter and a document browser.

BRIEF DESCRIPTION OF THE DRAWINGS

FIG. 5 illustrates a context specification.

FIG. 6 illustrates an anchor specification.

FIG. 7 illustrates a link specification.

FIG. 8 illustrates examples of a source specification.

DETAILED DESCRIPTION OF THE INVENTION

This patent application is related to copending U.S. patent application entitled "Automatic Generation Of Card-Based Presentation Documents From Multimedia Data", U.S. application Ser. No. 09/401,383, filed on Sep. 22, 1999 and assigned to the same assignee as the present invention.

Product documents are often related to many other types of documents, e.g., photo images of machine parts, schematic diagrams, CAD drawings, spare parts, etc . . . . and a source object may be linked to multiple destinations. Thus, a hyperlinking mechanism must also be able to insert multiple links in one single object. The situation can become even more complicated, i.e., if the information for different types of links for the same source are made available (or discovered) at different times throughout the life cycle of the product documents. Thus, incremental hyperlinking is essential. Most of the current multimedia tools do not support multiple links nor incremental hyperlinking. In order to integrate the processing of various types of link information (e.g., object id., URL, database query, etc . . . ), a link browser is needed which displays the list of multiple links for a source object and provides the preview capability to avoid accessing unwanted documents such as large CAD drawing images and video files that may require a significant amount of time to retrieve.

In the simplest form, hyperlinking tools insert links into source documents. However, to keep source documents intact, and to facilitate incremental hyperlinking, links are often stored separately in link files or databases. A link manager is needed to manage the link files and provide an API for other authoring and browsing tools to access and update the link information incrementally. When links are inserted into product documents, they usually confirm to the HTML or SGML standard; when they are stored separately in link files, they usually confirm to the HyTime standard.

Figure 2:
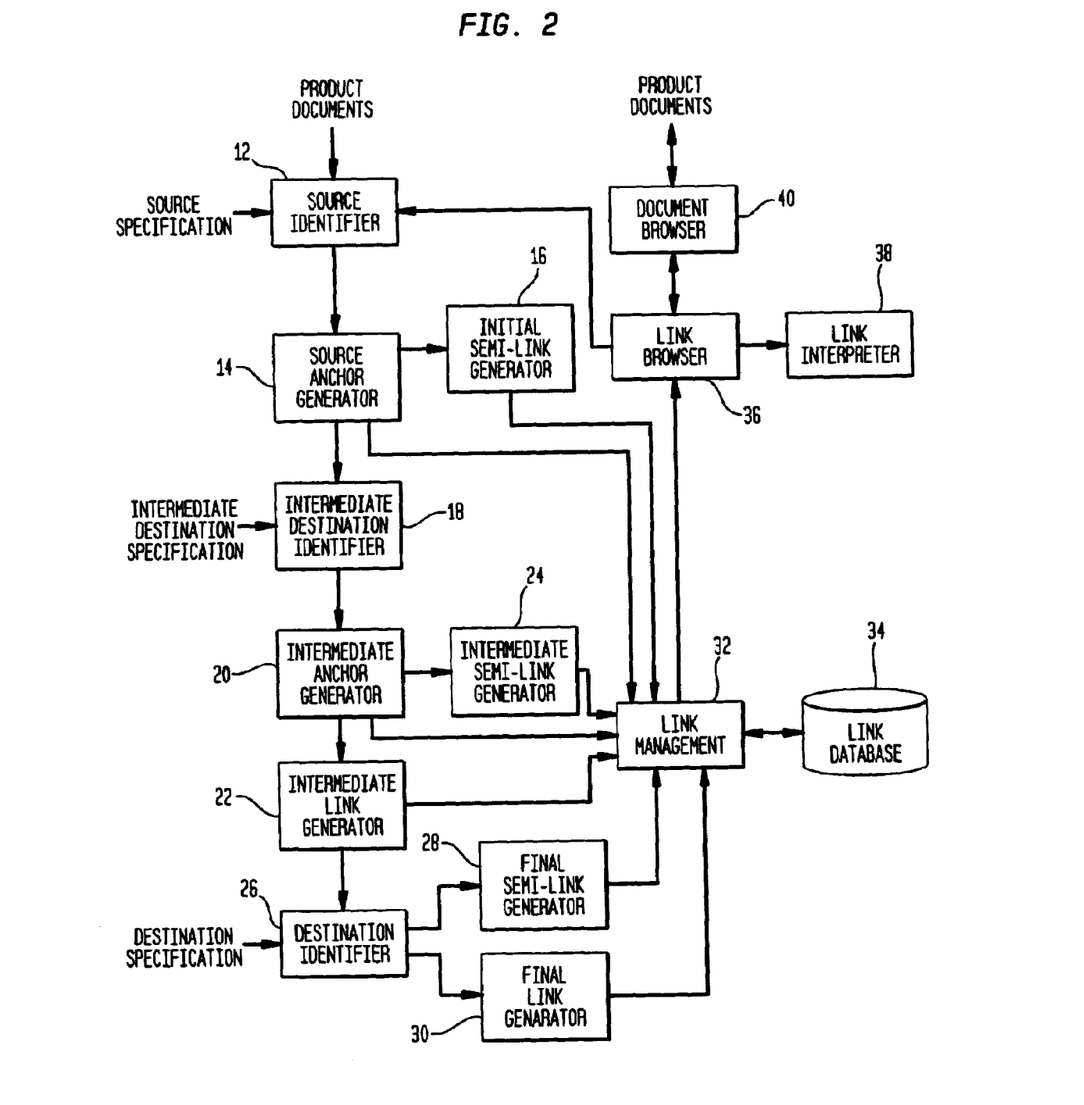
FIG. 2 illustrates a generalized hyperlinking system of the present invention.

A generalized hyperlinking system consists of a sequence of modules for identifying sources and destinations, generating and managing links and activating links to retrieve documents. A generalized hyperlinking system is illustrated in FIG. 2. Source identifier 12 parses a source specification to identify the sources of a type of link. In interactive link-editing mode, a source specification can be simply the id. of an object selected in a document (i.e., a trivial link), while in an automatic hyperlinking process, a source specification identifies a pattern and a context for a group of source objects in one or more documents. Based on the findings (i.e., one or more source objects) from source identifier 12, source anchor generator 14 generates anchors that are needed to inform the document browser of potential link sources. In some applications, information from source objects is sufficient to generate links and semi-links can be generated automatically at initial semi-link generator 16. Semi-links can be activated and interpreted by the link browser to effect hyperlinking behavior at browsing time.

For high-quality product documentation, the hyperlinking system continues to search for the destinations of the links at authoring time. In complex documents, it may become necessary to look up intermediate information in other documents before the final destination of the link can be determined. In intermediate destination identifier 18, intermediate hyperlink (destination) specifications are parsed to identify intermediate destinations. Based on the findings (i.e., one or more intermediate destination objects) from intermediate destination identifier 18, intermediate anchor generator 20 generates anchors that are needed as the "sources" for the final destinations. These are used for informing the document browser of potential intermediate links. In some applications, intermediate links may also contain useful information. Intermediate link generator 22 generates intermediate links that can actually effect hyperlinking behavior at browsing time. In the case where verifying the final destinations is not required at authoring time, semi-links for the intermediate destinations can be generated by intermediate semi-link generator 24 instead. Intermediate destination identification, intermediate anchor generation and intermediate link generation can be repeated as many times as necessary to extract as much intermediate information as needed in order to reach the final destinations.

At destination identifier 26, the document objects at the final destinations of a type of link are identified. That is, destination identifier 26 parses the (final) destination specification and makes use of all the information extracted from the sources and if any, all the intermediate destinations, to determine the final destinations for a specific type of link. This step is important to produce high-quality hyperlinked documents since it verifies, at least at authoring time, the existence of the final destination for each link from a source (through one or more intermediate destinations). The document objects at the final destinations can be located on the local machine or on a remote machine over the network. Once the final destinations have been identified, semi-links or "real" links can be generated depending on the application.

To generate a semi-link, a script or program for computing the document objects at the final destinations or any link information that makes no direct references to the document objects at the final destinations, is applied at semi-link generator 28. To generate a real link, a reference to the document object at the final destination based on the addressing mechanism adopted by the hyperlinking process can be applied at final link generator 30. As stated above, a reference to the document object at the final destination can be as simple as an id. of the document object in the document structure, a TEI address indicating the relative positions of all document objects on the path from the root object to final destination in the document structure, a URL indicating the network path of the file in which the document object is located, etc. . . .

Link management 32 provides API functions for storing and organizing all anchors and links that are generated in the process of hyperlinking a source to a final destination. The anchor and link information can be stored internally inside the documents, externally in a link database, or in a hybrid mode. API functions for link management are typical query functions for inserting and appending new link instances, replacing, deleting and retrieving existing links, etc . . . . If links are stored externally, link database 34 provides a typical relational database to support link management features. API functions for retrieving link information are also available to support link browsing at link browser 36.

Link browser 36 is usually invoked by a document browser, i.e., during document browsing, when an anchor with links is selected and activated, the link information is extracted from the document or a link database through link management API functions and link browsing is started. Link browsing can be performed by "jumping" to the link destinations directly or by invoking a GUI to provide the user more information before jumping to the link destinations. In either case, link interpreter 38 provides the support for interpreting the structure of a single link instance or a set of multiple link instances. Depending on the addressing mechanism adopted by the hyperlinking process, a "real" link can be simply a single id. number that needs no further processing or a complicated list of information that needs to be parsed and interpreted in order to identify the document object at the destination. If it is a semi-link, an external program may have to be invoked to process the script or procedure to retrieve the document object at the destination.

Document Browser 40 interacts with the link browser in two ways. That is, the document browser invokes the link browser, when an anchor with link information is activated by the user. It extracts link information from the documents and passes it to the link browsing mechanism. On the other hand, the document browser is invoked by the link browser, when a link is interpreted and the location of the needed document is uncovered. The link browser also extracts information from the link instance and passes it to the document browser to effect application-specific behavior, e.g., scrolling to a specific paragraph and highlighting a specific word on the destination document, paning to a specific graphic object on the destination media, etc . . . .

Link authoring can also be integrated in a document browser to support dynamic hyperlinking. In this case, link authoring starting at source identifier 12 is triggered by link browser 36 which is in turn triggered by document browser 40. As discussed above, due to the time constraint, dynamic hyperlinking mostly finishes by generating a semi-link at initial semi-link generator 16 so that document browsing can continue at link browser 36 and document browser 40 as soon as possible.

The generalized hyperlinking process includes a Generalized Hyperlink Specification Language (GHSL) for the author to specify sources, intermediate destinations, and destinations of hyperlinks. In GHSL, source, intermediate destination, and destination specifications are specified separately. Although not completely independently, they can be saved and processed individually at different stages of the hyperlinking process for different applications and they are related to one another by the information that they extract, generate and store in the link database through the link management API.

Figure 3:
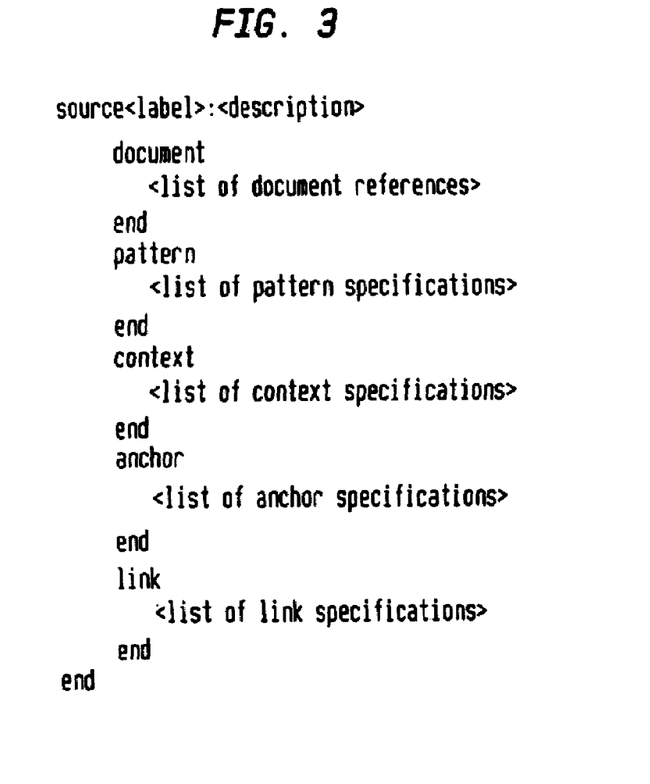
FIG. 3 illustrates a source specification.

The definition of the source specification is shown in FIG. 3. It consists of a label, a list of document references, a list of patterns, a list of contexts, a list of anchors and a list of links. A label is used to uniquely identify a source specification and all anchors and links that are generated from the source specification. Since all information associated with source, intermediate destination and destination specifications is uniquely labeled when stored in the link database, it is possible to separate these three types of specifications and allow them to be processed individually at different stages of the hyperlinking process. A source specification also includes a list of document references (e.g., document file names) of which the document objects are matched against the patterns and contexts that follow.

Figure 4:
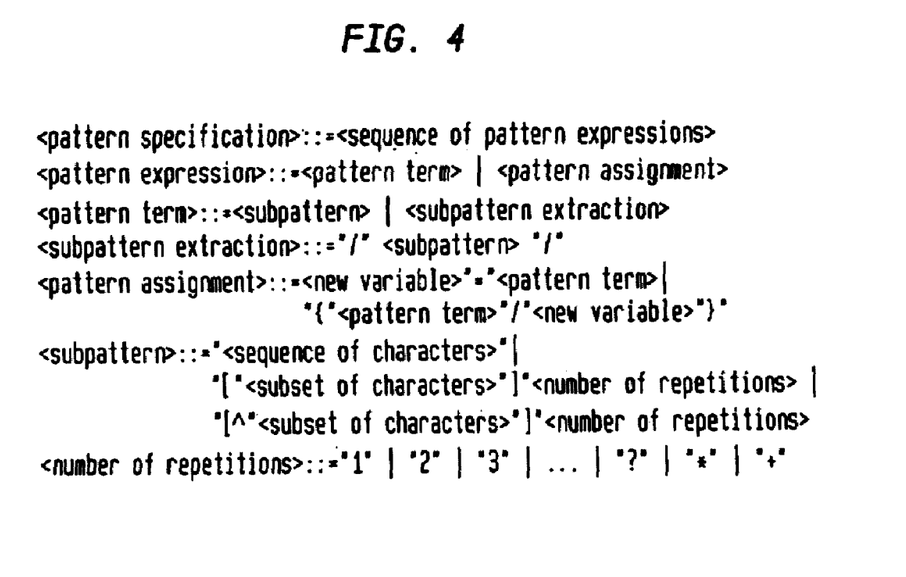
FIG. 4 illustrates a pattern specification.

Each source specification specifies a list of patterns to identify the contents and attributes of a set of document objects that can be the sources of a type of link. A pattern is represented as a regular expression. This is further described by A. V. Aho and J. D. Ullman in "Principles of Compiler Design", Addison-Wesley, Reading Mass., 1977. Each pattern consists of a sequence of pattern expressions, and each pattern expression is a pattern term or a pattern assignment. A pattern term can be a subpattern or a subpattern extraction. A pattern assignment is a pattern term that is assigned to a variable, such that the variable can be used to refer to an instance of the pattern after pattern matching is performed. A pair of "("and ")" can be used to group one or more subpatterns and a group of subpatterns is processed in the same way as a single subpattern. The definition of the pattern specification is shown in FIG. 4. The list of patterns in a source specification forms an OR-combination of the patterns, i.e., all document objects whose contents or attributes match any of the specified patterns are the source instances of a specified type of link.

A source specification also specifies a list of contexts to further restrict the scopes of the document structures in which the document objects that match the specified patterns must exist to be qualified as the sources of a type of link. A context specification is simply a context expression, which is a context term or a context assignment. A context term is a relationship between a document object and its neighboring objects or more generally, a context term is a relationship between a subcontext (represented by a context expression) and its neighboring subcontexts. A context assignment is a context term that is assigned to a variable, such that the variable can be used to refer to the corresponding context later in the specifications. The definition of the context specification is shown in FIG. 5. The relationships between a document object and its neighboring objects are hierarchical relationships as listed in FIG. 5. A specification of a document object is the same as that in SGML, i.e., it is an object name (or SGML tag) followed by a list of attribute names and attribute values.

A pattern specification together with a context specification identifies a set of document objects as the sources of a type of link in a list of documents. Once a source object is located, an anchor can be inserted in the document and if necessary, link information can be also be generated. An anchor specification specifies a location where an anchor can be inserted in the source document to inform the document browser of the existence of a source object of a type of link. In the generalized method, an anchor specification is represented as a simple form of a structure transformation that transforms a source context into a new context incorporating one anchor object (or more). This is shown in FIG. 6. An anchor context is similar to a source context except that objects identified in a source context are often assigned to variables and the variables can be used to refer to the source objects in the anchor context.

A link specification specifies updates to the link information "stored" in the content and attributes of an anchor object. This is shown in FIG. 7. Typically, new link information replaces the existing link information in an anchor by the assignment operator "=" Note that "=NULL" removes all existing link information. To support multiple links and incremental hyperlinking, new link information can also be appended to an anchor by the append operator "+=". A link value is a record of link information and can be any string required by a hyperlinking application or a list of link fields as suggested in FIG. 7. To generate a new link, a list of link field assignments is specified and each assigns a value to a specific link field. A full link record can be specified by a sequence of values for all link fields and NULL can be used in the link fields whose values are unspecified.

An example of a source specification is shown in FIG. 8. The source specification S101 identifies all KKS numbers (a numbering scheme adopted in the power plant industry) whose pattern is "MB" [A–Z] [0–9]2[A–Z]2[0–9]3. The KKS number pattern is also assigned to the variable "p". In order for the pattern "p" to be qualified as a link source, it must also be located in the context of <AnyDocX><ParaX, ParaX2, ParaX3, ParaX4, ParaX5>, where <ParaX, ParaX2, . . . > refers to any one of the SGML tags in the list. When such a pattern is found, an anchor <KKSNum> is inserted (if such an anchor does not exist already), whose content is the pattern found. The KKS number anchor is also assigned to the variable "a". A semi-link record can be appended to the Linkend attribute of the KKS number anchor "a".

Figure 9:
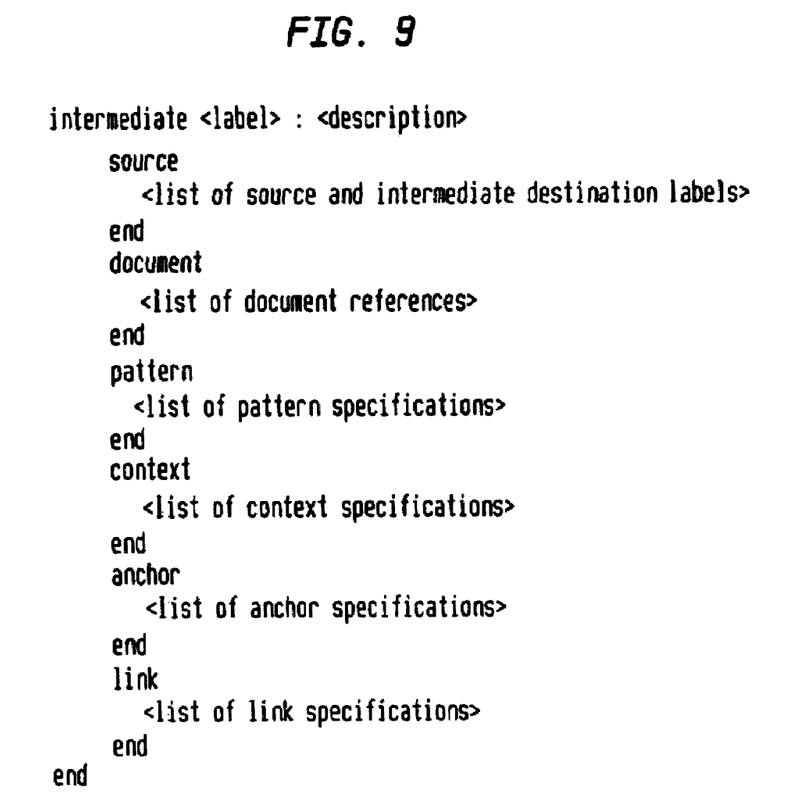
FIG. 9 illustrates an intermediate destination specification.

The definition of the intermediate destination specification is shown in FIG. 9. It is similar to that of the source specification except that in order to relate an intermediate destination to its sources and other intermediate destinations, a list of labels for the sources and intermediate destinations is specified at the beginning. Thus, all variables introduced in the specified source and intermediate destination specifications are imported to the current intermediate destination specification and all document objects that have been identified by the specified source and intermediate specifications become the sources of the current intermediate destination specification.

Figure 10:
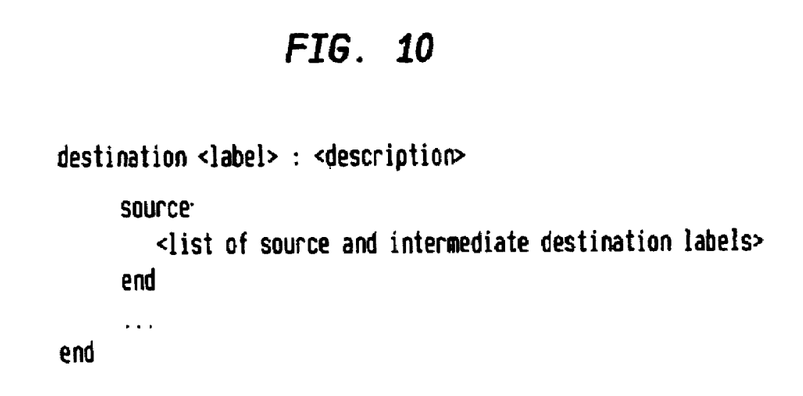
FIG. 10 illustrates a destination specification.

The definition of the (final) destination specification is shown in FIG. 10. It is the same as that of the intermediate specification except that its label is never used by other specifications and usually its anchor specification is also not necessary. This is because it is the last step of the hyperlinking process for a specific type of link.

Figure 11:
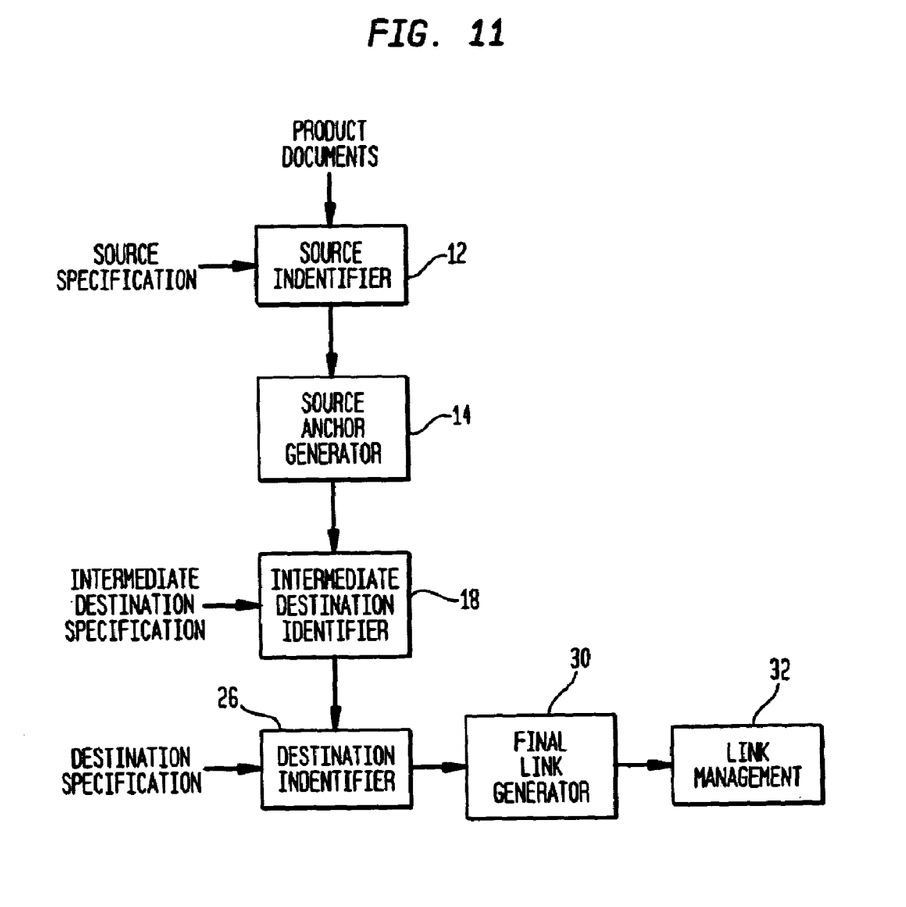
FIG. 11 illustrates static hyperlinking of the present invention.

The following will describe static and incremental hyperlinking. The generalized hyperlinking process can be used to model static hyperlinking, i.e, all hyperlinking information is completely processed and generated at authoring time as opposed to dynamic hyperlinking where all hyperlinking information is completely processed and generated at browsing time. A typical system of static hyperlinking is shown in FIG. 11. It consists of source identifier 12, source anchor generator 14, intermediate destination identifier 18, destination identifier 26, final link generator 30 and link management 32 of the generalized process. That is, it involves only the steps of the generalized automatic hyperlinking process to locate the source, all intermediate destinations and the final destination. It generates only the anchors for the source objects and links directly from the sources to the final destinations. Link information is completely verified and generated at authoring time and is managed by the link manager. The link management API is provided to support link browsing at browsing time.

Figure 12:
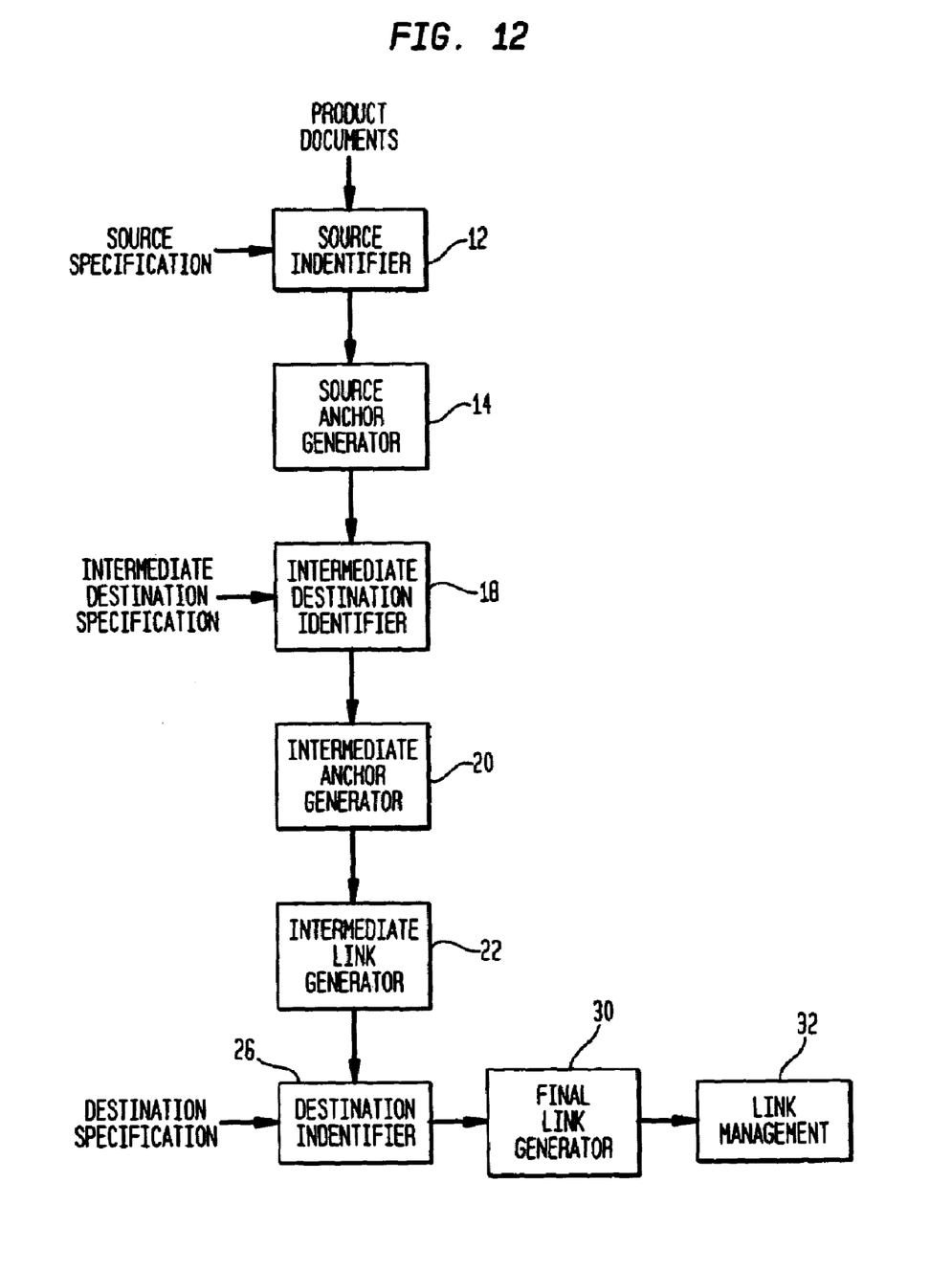
FIG. 12 illustrates static hyperlinking with intermediate links.

To support viewing of intermediate destinations in static hyperlinking, anchors and links for intermediate destination can also be generated and managed by the link manager. Static hyperlinking with intermediate links comprises source identifier 12, source anchor generator 14, intermediate destination identifier 18, intermediate anchor generator 20, intermediate link generator 22, destination identifier 26, final link generator 30 and link management 32. This is shown in FIG. 12. As described above, the link browser can provide two different browsing styles for links that involve intermediate destinations. That is, it can automatically follow all the intermediate destinations to reach the final destination directly or it can prompt the user at one or more of the intermediate destinations, depending on the applications.

Figure 13:
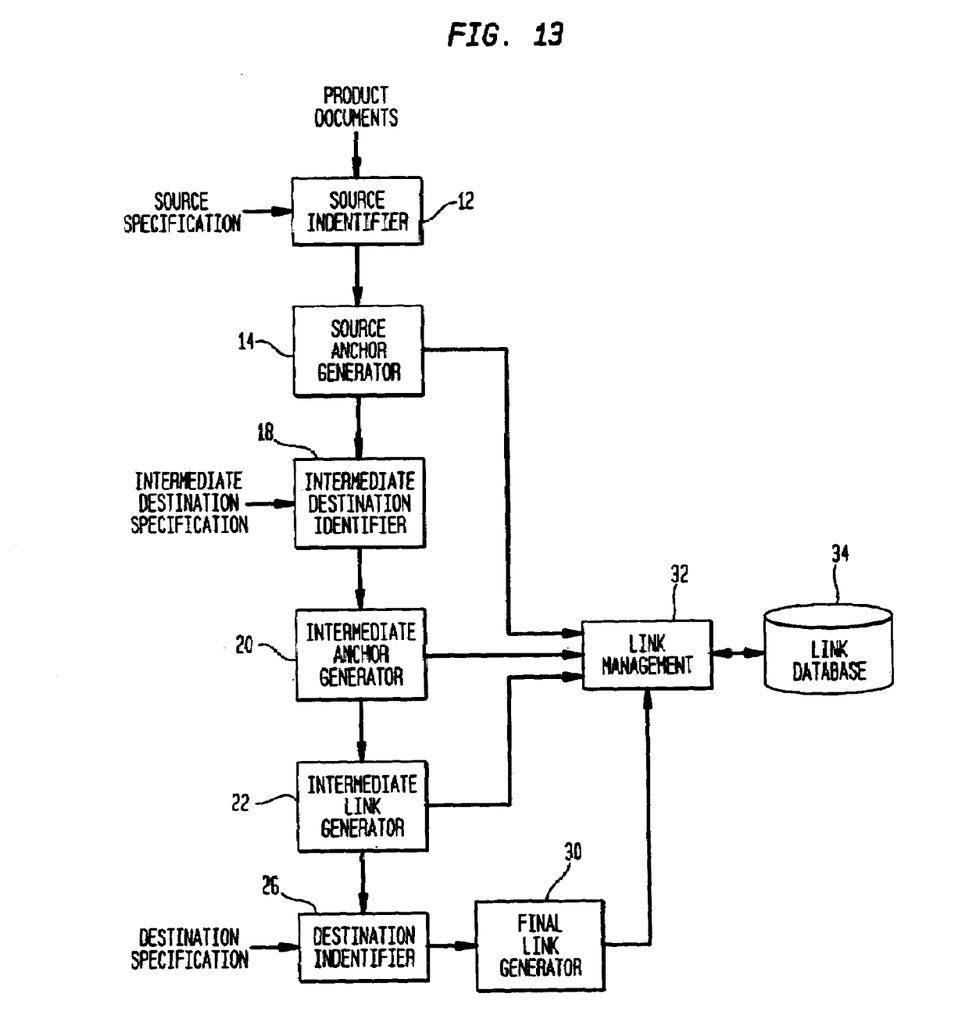
FIG. 13 illustrates incremental hyperlinking of the present invention.

There are two aspects of incremental hyperlinking that can be supported: processing source and destination objects incrementally and updating link instances incrementally. Since the generalized hyperlinking process is well-modularized, incremental hyperlinking can be easily supported by storing all anchor and link information in the link database, managing them by the link manager and providing the link management APIs to all link authoring and browsing modules. This is shown in FIG. 13. Incremental hyperlinking comprises source identifier 12, source anchor generator 14, intermediate destination identifier 18, intermediate anchor generator 20, intermediate link generator 22, destination identifier 26, final link generator 30, link management 32 and link database 34. On the other hand, since the GHSL is also "well-modularized", anchor and link information generated at all stages can be stored and managed incrementally so that new anchors and links can be appended to (or existing anchors and links can be removed from) the link database at any time during the life span of the product documents.

Link changes are caused by either link rule changes or document changes. Link rules are changed due to the fact that new link rules are created or existing link rules are revised or become obsolete. In this case, it is possible to process the new link rules or revised rules to "incrementally" update the link instances in the link database accordingly. Similarly, during the lifetime of a product, new product documents may be created or existing product documents may be revised or become obsolete. In this case, link rules whose sources, intermediate destinations or destinations are located in the affected documents are re-processed and link instances in the link database are incrementally updated accordingly.

Figure 14:
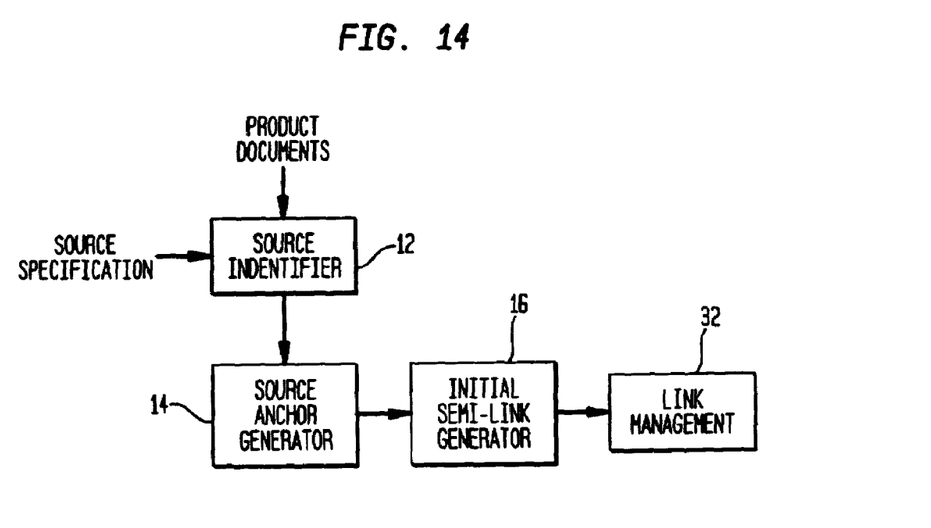
FIG. 14 illustrates source-level partial hyperlinking of the present invention.

The following will describe partial and dynamic hyperlinking. The generalized hyperlinking process can be applied to partial hyperlinking at three different stages, i.e., it is possible to generate links at source level, intermediate destination level or even final destination level by specifying link information based on whatever information extracted from all steps before the point where a semi-link is to be generated. An example of source-level partial hyperlinking is shown in FIG. 14. It comprises source identifier 12, source anchor generator 14, initial semi-link generator 16, and link management 32 of the generalized process. In this case, a link specification is specified in the source specification (for the source anchor), and only the information from a source object is available for computing the destination at browsing time. Source-level partial hyperlinking is very simple to implement at authoring time and its hyperlink behavior is very flexible at browsing time, i.e., most of its hyperlinking behavior is determined by the script or program that is invoked or interpreted by the link browser to process the source-level semi-links at browsing time.

To support partial hyperlinking at intermediate destination level, link specifications are specified at the intermediate destination specifications. To support partial hyperlinking at final destination, link specifications are specified at the final destination specifications. In the last case, though the links are semi-links, they can be verified properly at authoring time.

Figure 15:
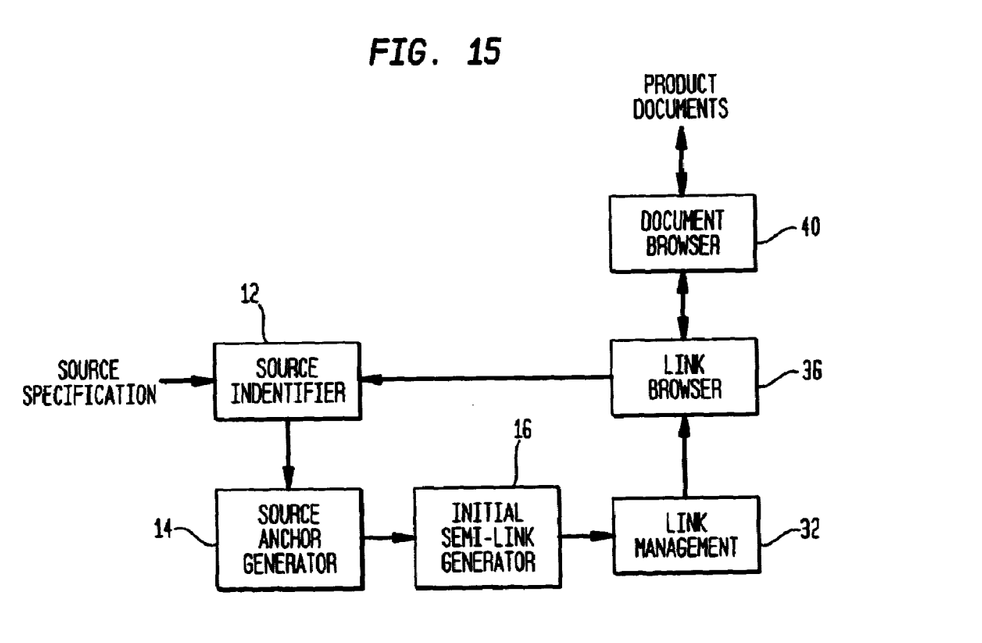
FIG. 15 illustrates source-level dynamic hyperlinking of the present invention.

To support dynamic hyperlinking, the link authoring process is initiated by the link browser at browsing time, as shown in FIG. 15. It comprises document browser 40, link browser 36, source identifier 12, source anchor generator 14, initial semi-link generator 16, and link management 32 of the generalized process. Due to the time constraint at browsing time, source-level partial hyperlinking is applied so that the hyperlinking process can be completed without too much delay. Once semi-links are generated, they are managed by the link manager, and are available next time the same links are expected. So, the overhead is only incurred for the first time a document is being viewed. It is thus dependent on the user to determine the amount of delay that is tolerable when viewing a document for the first time. If the user can afford the overhead, it is possible to generate all anchors and links through the entire hyperlinking process to achieve the same precision and completeness of a static hyperlinking with incremental processing capability.

Depending on the applications and the overhead that is tolerable when browsing a document for the first time, dynamic hyperlinking at the intermediate destination level and the final destination level can also be configured from the generalized process. An implementation can provide a list of different types of hyperlinking as options to the user at browsing time.

In summary, the present invention includes the following:

1. A generalized automatic hyperlinking process (GHP) is designed based on a generalized hyperlinking specification language to support various hyperlinking paradigms including static, incremental, partial and dynamic hyperlinking.

2. The generalized hyperlinking specification language (GHSL) consists of source specifications, intermediate destinations and destination specifications.

3. The specification is used to specify a list of patterns to identify the contents and attributes of a set of document objects that can be the sources of a link. It consists of the following parts: (a) a document part is to describe a list of documents for hyperlink source addressing domain, (b) a pattern part consists of a list of pattern expressions and is to specify possible source variations of a type of link in documents, (c) a context part is to link sources constraint context under document domain, (d) an anchor part is to specify a location where an anchor can be inserted in the source document, (e) a link part is to specify updates to the link information "stored" in the content and attributes of an anchor.

4. The anchor and link specification provides a unique modular design of a complete link information. It can support various hyperlinking paradigms since anchor, source or destination link information could be found separately at different hyperlinking stages such as author-time, run-time, etc . . . .

5. The intermediate destination specifications are similar to the source specifications except that a list of labels for identifying source or intermediate destinations at the beginning. All variables in current intermediate destination specifications should come from specified source and intermediate destination specifications.

6. The final destination specification is similar to intermediate destination specifications except its label is never used by other specifications. In addition, its anchor part is often not necessary since it is the last destination point of hyperlinks.

7. The generalized automatic hyperlinking process consists of the followings steps:
   Step 1—identify the sources of a type of link from source specification.
   Step 2—generate anchors
   Step 3—generate initial semi-links
   Step 4—identify intermediate destinations from intermediate destination specifications
   Step 5—generate intermediate anchors
   Step 6—generate intermediate semi-links
   Step 7—generate intermediate links
   Step 8—identify destination of a type of link from destination specification
   Step 9—generate final semi-links
   Step 10—generate final links
   Step 11—provide APIs for storing and organizing all anchors, semi-links and final-links
   Step 12—provide link database
   Step 13—run-time link browsing
   Step 14—run-time link interpretation for both semi-links and final-links
   Step 15—document browsing.

8. The static hyperlinking with intermediate links process is a specialized case of GHP and consists of source identifier 12, source anchor generator 14, intermediate destination identifier 18, intermediate anchor generator 20, intermediate link generator 22, destination identifier 26, final link generator 30 and link management 32. This is shown in FIG. 12.

9. The incremental hyperlinking process is a specialized case of GHP and consists of source identifier 12, source anchor generator 14, intermediate destination identifier 18, intermediate anchor generator 20, intermediate link generator 22, destination identifier 26, final link generator 30, link management 32 and link database 34. This is shown in FIG. 13.

10. The source-level partial hyperlinking process is a specialized case of GHP and consists of source identifier 12, source anchor generator 14, initial semi-link generator 16 and link management 32.

11. The source-level dynamic hyperlinking process is a specialized case of GHP and consists of source identifier 12, source anchor generator 14, initial semi-link generator 16, link management 32, link browser 36 and document browser 40.

It is not intended that this invention be limited to the hardware or software arrangement or operational procedures shown disclosed. This invention includes all of the alterations and variations thereto as encompassed within the scope of the claims as follows.

The invention claimed is:

1. A generalized automatic hyperlinking system comprising a computer on which software modules are executed, the system comprising:
   a source-level partial hyperlinker comprising a source identifier and a source anchor generator connected to said source identifier;
   a source-level dynamic hyperlinker;
   a static hyperlinker for automatically generating static hyperlinks;
   a static hyperlinker with intermediate links; and
   an incremental hyperlinker,
   wherein the source identifier and the source anchor generator support the application of the incremental hyperlinker and the source-level dynamic hyperlinker on document objects at different hyperlinking stages.

2. A generalized automatic hyperlinking system as claimed in claim 1 wherein said source-level partial hyperlinker further comprises:
   an initial semi-link generator connected to said source anchor generator; and
   a link manager connected to said initial semi-link generator.

3. A generalized automatic hyperlinking system as claimed in claim 1 wherein said source-level dynamic hyperlinker comprises:
   an initial semi-link generator connected to said source anchor generator;

a link manager connected to said initial semi-link generator;

a link browser connected to said source identifier and said link manager for interpreting hyperlinks that have been fully or partially generated;

a document browser connected to said link browser.

4. A generalized automatic hyperlinking system as claimed in claim 1 wherein said static hyperlinker comprises:

an intermediate destination identifier connected to said source anchor generator;

a destination identifier connected to said intermediate destination identifier;

a final link generator connected to said destination identifier; and a link manager connected to said final link generator.

5. A generalized automatic hyperlinking system as claimed in claim 1 wherein said static hyperlinker with intermediate links comprises:

an intermediate destination identifier connected to said source anchor generator;

an intermediate anchor generator connected to said intermediate destination identifier;

an intermediate link generator connected to said intermediate anchor generator;

a destination identifier connected to said intermediate destination identifier;

a final link generator connected to said destination identifier; and a link manager connected to said final link generator.

6. A generalized automatic hyperlinking system as claimed in claim 1 wherein said incremental hyperlinker comprises:

an intermediate destination identifier connected to said source anchor generator;

an intermediate anchor generator connected to said intermediate destination identifier;

an intermediate link generator connected to said intermediate anchor generator;

a destination identifier connected to said intermediate destination identifier;

a link manager connected to said source anchor generator, said intermediate anchor generator; said intermediate link generator and said final link generator; and a link database connected to said link manager.

7. A generalized automatic hyperlinking system comprising a computer on which software modules are executed, the system comprising:

a source identifier;

a source anchor generator connected to said source identifier;

an initial serial-link generator connected to said source anchor generator; and a link manager connected to said initial semi-link generator;

wherein the source identifier, the source anchor generator, and the initial semi-link generator support incremental hyperlinking and dynamic hyperlinking.

8. A generalized automatic hyperlinking system as claimed in claim 7, further comprising:

a link browser connected to said source identifier and said link manager for interpreting hyperlinks that have been fully or partially generated; and a document browser connected to said link browser.

9. A generalized automatic hyperlinking system comprising a computer on which software modules are executed, the system comprising:

a source identifier;

a source anchor generator connected to said source identifier;

an intermediate destination identifier connected to said source anchor generator;

a destination identifier connected to said intermediate destination identifier;

a final link generator connected to said destination identifier; and a link manager connected to said final link generator;

wherein the source identifier and the source anchor generator support incremental hyperlinking and dynamic hyperlinking at different hyperlinking a stages for extracting information from accessible documents at each of the different hyperlinking stages.

10. A generalized automatic hyperlinking system as claimed in claim 9 further comprising:

an intermediate anchor/link generator connected between said intermediate destination identifier and said destination identifier wherein said intermediate anchor/link generator comprises:

an intermediate anchor generator connected to said intermediate destination identifier; and an intermediate link generator connected between said intermediate anchor generator and said destination identifier.

11. A generalized automatic hyperlinking system as claimed in claim 10 further comprising:

wherein said link manager is connected to said source anchor generator, said intermediate anchor generator and said intermediate link generator.

12. A generalized automatic hyperlinking system as claimed in claim 11 further comprising:

a link database connected to said link manager.

13. A generalized automatic hyperlinking system as claimed in claim 11 further comprising:

an initial semi-link generator connected to said source anchor generator and said link manager;

an intermediate semi-link generator connected to said intermediate anchor generator and said link manager;

a final semi-link generator connected to said destination identifier and said link manager.

14. A generalized automatic hyperlinking system as claimed in claim 13 further comprising:

a link browser connected between said source identifier and said link manager for interpreting hyperlinks that have been fully or partially generated.

15. A generalized automatic hyperlinking system as claimed in claim 14 further comprising:

a document browser connected to said link browser.

16. A generalized automatic hyperlinking system as claimed in claim 14 further comprising:

a link interpreter connected to said link browser.

17. A generalized automatic hyperlinking system as claimed in claim 16 further comprising:

a document browser connected to said link browser.

18. A computer-implemented method for automatic hyperlinking comprising the steps of:

identifying a source;

generating a source anchor;

generating an initial semi-link;

utilizing link management;

utilizing a document browser, said document browser for viewing and following links from one document to another; and wherein the source and the source anchor support incremental hyperlinking and dynamic hyperlinking at different hyperlinking stages for extracting information from accessible documents at each of the different hyperlinking stages.

19. A method for automatic hyperlinking as claimed in claim 18 further comprising the steps of:
utilizing a link browser for interpreting hyperlinks that have been fully or partially generated.

20. A computer-implemented method for automatic hyperlinking comprising the steps of:
identifying a source;
generating a source anchor;
identifying an intermediate destination based on user-defined criteria;
identifying a destination based on user-defined criteria;
generating a final link; and
utilizing link management;
wherein the source and the source anchor support incremental hyperlinking and dynamic hyperlinking.

21. A method for automatic hyperlinking as claimed in claim 20 further comprising the steps of:
generating an intermediate anchor/link; wherein generating said intermediate anchor/link comprises the steps of:
generating an intermediate anchor; and
generating an intermediate link.

22. A method for automatic hyperlinking as claimed in claim 21 further comprising the steps of:
utilizing a link database.

23. A method for automatic hyperlinking as claimed in claim 21 further comprising the steps of:
generating an initial semi-link;
generating an intermediate semi-link; and
generating a final semi-link.

24. A method for automatic hyperlinking as claimed in claim 23 further comprising the steps of:
utilizing a link browser for interpreting hyperlinks that have been fully or partially generated.

25. A method for automatic hyperlinking as claimed in claim 23 further comprising the steps of:
utilizing a link interpreter; and
utilizing a document browser.

26. A generalized automatic hyperlinking system comprising a computer on which software modules are executed, the system comprising:
a source identification module;
a source anchor generation module connected to said source identification module;
an initial semi-link generation module connected to said source anchor generation module;
an intermediate destination identification module connected to said source anchor generation module;
an intermediate anchor generation module connected to said intermediate destination identification module;
an intermediate link generation module connected to said intermediate anchor generation module;
an intermediate semi-link generation module connected to said intermediate anchor generation module;
a destination identification connected to said intermediate link generation module;
a final semi-link generation module connected to said destination identification module;
a final link generation module connected to said destination identification module;
a link management module connected to said initial semi-link generation module, said source anchor generation module, said intermediate semi-link generation module, said intermediate link generation module, said final semi-link generation module and said final link generation module;
a link database connected to said link management module;
a link browser connected to said link management module and said source identification module;
a link interpretation module connected to said link browser, said link browser invoking the link interpretation module for determining actions to be taken when a link is selected; and
a document browsing module connected to said link browser;
wherein the source identification module and the source anchor generation module support incremental hyperlinking and dynamic hyperlinking.

* * * * *